Jan 6, 1931.   A. M. HUDSON ET AL   1,787,682
CURRENT CONTROLLING MECHANISM FOR AUTOMOBILE SIGNALS
Filed Feb. 14, 1928   3 Sheets-Sheet 2

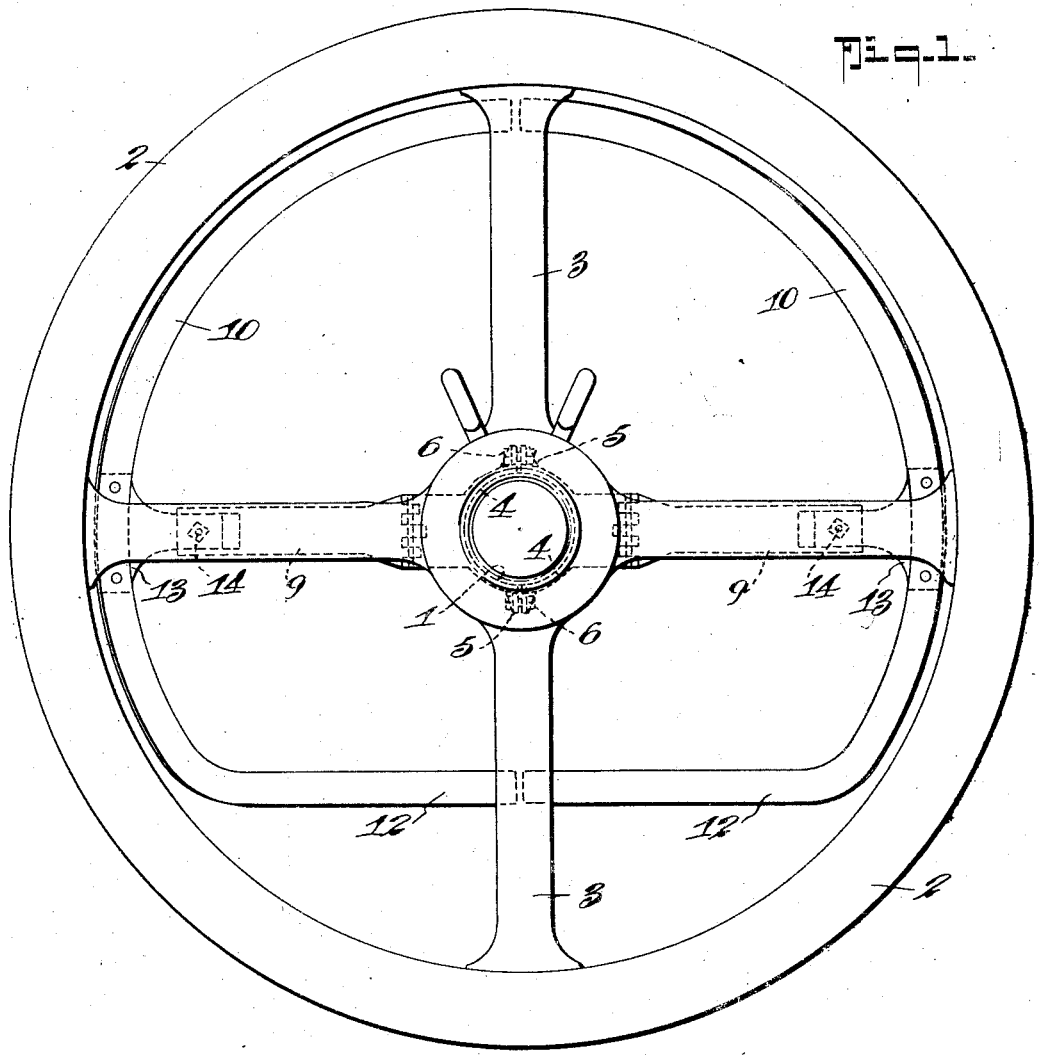
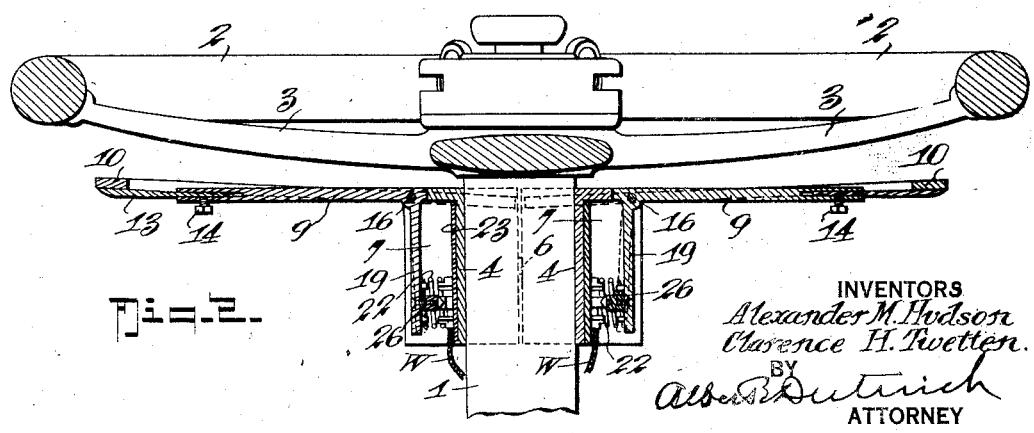

INVENTORS
Alexander M. Hudson
Clarence H. Tvetten
BY
Albert R. Dietrich
ATTORNEY Jan 6, 1931.          A. M. HUDSON ET AL          1,787,682
        CURRENT CONTROLLING MECHANISM FOR AUTOMOBILE SIGNALS
                    Filed Feb. 14, 1928        3 Sheets-Sheet 3
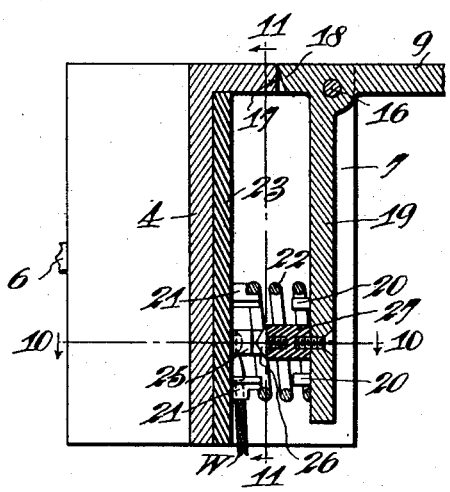
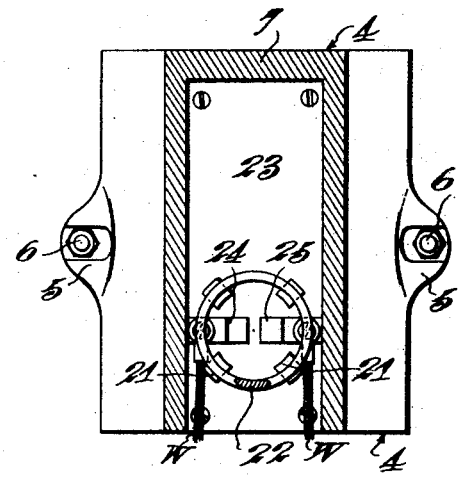
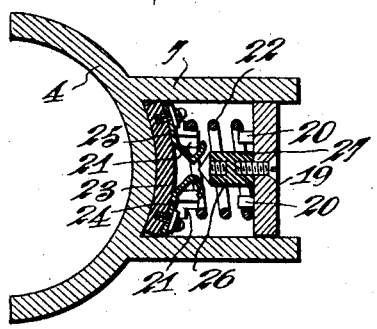
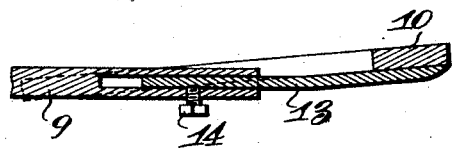
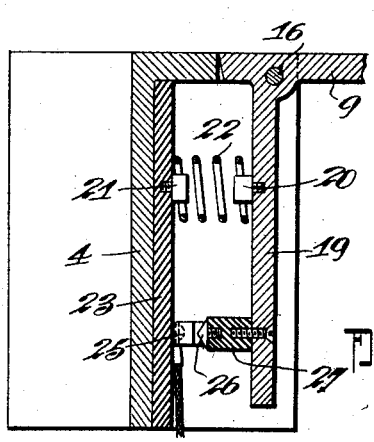
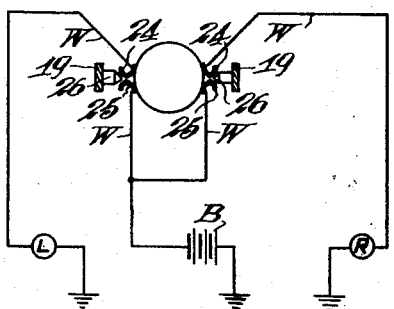
INVENTORS
Alexander M. Hudson
Clarence H. Twetten
BY
Albert E. Dietrich
ATTORNEY Patented Jan. 6, 1931

1,787,682

UNITED STATES PATENT OFFICE

ALEXANDER M. HUDSON AND CLARENCE H. TWETTEN, OF ROUND LAKE, MINNESOTA

CURRENT-CONTROLLING MECHANISM FOR AUTOMOBILE SIGNALS

Application filed February 14, 1928. Serial No. 254,260.

Our invention relates to certain new and useful improvements in circuit controlling mechanism for auto vehicle signals and particularly to those known as right and left turn signals.

Heretofore a number of devices have been proposed for attachment to the steering wheel of an automobile, by means of which when the operator desires to make a right or left turn he can close the circuit to the desired signal. All those devices heretofore proposed, with which we are familiar, are more or less objectionable for one reason or another, as for example expense of manufacture, unsightly appearance, unreliability, weakening of steering wheel rim, interference with proper steering operations, etc. etc.

Our invention, in general, has for an object to provide an apparatus which will eliminate the objections aforesaid.

Further objects are to provide a circuit controller which is entirely free of the steering wheel; a circuit controller which is adjustable to almost any type of car; one by means of which the signal can be given in advance of the desired movement of the steering wheel to change direction of the vehicle; one by which the signal can be given at any time and without removing the hand from the steering wheel rim.

Further it is an object to provide a mechanism of the class described that may be operated either by thumb or back of fingers as may be found desirable by the operator.

A further object is to provide a circuit switch whose operating element may be adjusted nearer to or farther from the steering wheel rim to suit the convenience of the particular user.

A still further object is to provide a circuit switching mechanism which is so designed that the operator can maintain the signal while the turn is being made, i. e., while the steering wheel is being revolved in a complete circle all without having to remove his hands from the wheel.

Further it is an object to provide a device in which the signal controls are always in the same absolute location with relation to the driver,—the "left" is always at his left hand, the "right" is always at his right hand, regardless of how much the wheel may be turned or adjusted to take up slack.

Yet another object is to make provisions whereby the thumb or fingers of the operator will quickly slide off the circuit controller at such places as will prevent giving a wrong signal, as by the hand slipping too far and establishing the opposite contact from the one desired.

Other objects will in part be obvious and in part be pointed out hereinafter.

To the attainment of the aforesaid objects and ends, our invention consists in the novel details of construction and in the combination, connection and arrangement of parts hereinafter more fully described and then pointed out in the claims.

In the drawings:

Figure 1 is a plan of a steering wheel with our invention in place.

Figure 2 is a longitudinal section taken substantially on the line 2—2 on Figure 1, parts being shown in elevation.

Figure 6 is a detail vertical section on the line 6—6 of Figure 3.

Figure 7 is a detail vertical section on the line 7—7 of Figure 3.

Figure 8 is a detail section similar to Figure 6, showing a slight modification of the invention.

Figure 9 is a detail diagrammatic view of the circuit connections with which our invention may be employed.

Figure 10 is a detail horizontal section on the line 10—10 of Figure 6.

Figure 11 is a detail vertical section on the line 11—11 of Figure 6.

In the drawings, in which like numerals and letters of reference indicate like parts in all the figures, 1 represents the steering wheel post, 2 the steering wheel rim, 3 the spokes of the steering wheel, all of which may be of the usual construction.

Figure 3:
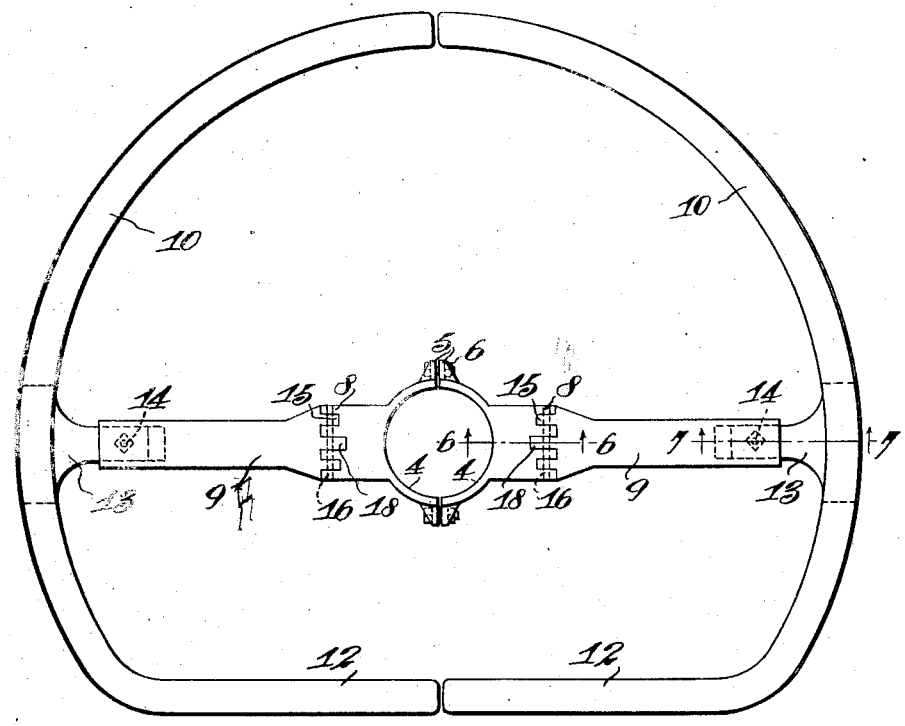
Figure 3 is a plan view of our device by itself.
Figure 5:
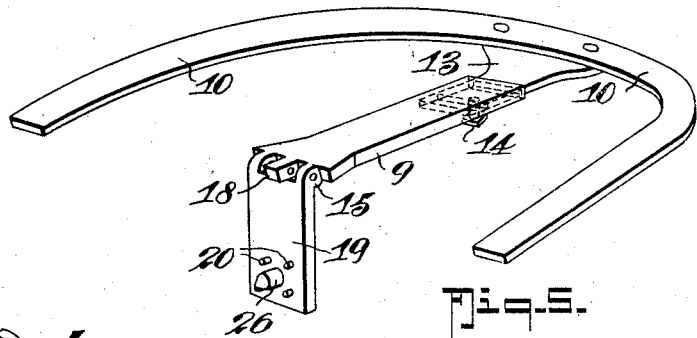
Figure 5 is a perspective view of one of the L-shaped levers and the actuating rim section carried thereby.
Figure 4:
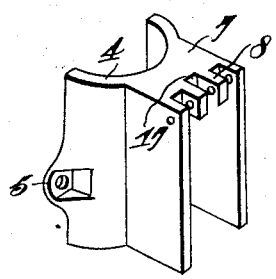
Figure 4 is a perspective view of one of the clamp and support members.

Secured to the steering wheel post 1 is a two-part clamp and support member 4, each part having ears 5 for the reception of bolts 6 so that the clamp and support member may be secured rigidly to steering wheel posts of variable diameters. Each clamp and support member 4 is provided with a radial socket extension 7, the upper outer edges of which are provided with hinge elements 8 to receive the hinge elements 15 of the L-shaped levers 9, the longer arms of which constitute spokes for carrying the actuating rim-sections 10. These rim sections 10 are preferably mounted on the spokes or long arms of the levers 9 midway the ends of the rim sections, and the rim-sections may or may not be made of flexible material as desired. For the more expensive cars we prefer to make these rim-sections of flexible material as that will be more convenient for the operator if he desires to operate the signal by means of the backs of his fingers.

Each rim-section 10 near the bottom at a point 12 is turned inwardly parallel to the spokes 9 as at 11, the purpose of which presently will appear. The long arms of each lever 9 are composed of telescopic sections, one of which 13 forms an extension to which the rim-section 10 is secured and by means of which and of a fastening screw or other device 14, the rim's location with respect to the steering wheel rim may be adjusted at will.

Each lever 9 at the angle or corner is provided with hinge elements 15 which, when associated with the hinge elements and hinge pins 16, constitute a hinge joint between the levers 9 and the support members 4. In order to limit the movement of the levers in one direction so as normally to maintain the rim-sections 10 in a given position the support members 4 are provided with one-way stops 17 to cooperate with similar stops 18 on the levers 9.

The vertical legs 19 of the levers 9 are adapted to operate in the socket extension 7 and will effect closures for the radial openings thereof. Each leg 19 is provided with suitably located lugs 20 to hold springs 22 that are located in the socketed extensions 7 and are also mounted on lugs 21 which space the springs from the backs of the sockets for a purpose presently made clear.

In each socket there is secured a suitable insulator 23, on which circuit terminal contacts 24 and 25 are mounted. These contacts are preferably mounted concentric with the springs, that is to say, they project into the springs but, of course, are held out of electrical contact with the springs. Instead of projecting the contacts into the springs the springs may be located at a different level than the contacts (see Figure 8). The vertical legs 19 each carry a circuit closer contact 26 mounted on a suitable knob 27 of insulation so that when 26 engages 24 and 25 the circuit will be closed between those contacts.

In the diagrammatic figure, Figure 9, W indicates the circuit wires between the contacts 24 and 25 and the signals L and R respectively and the battery B, it being understood that the signals and battery are in circuit with the contacts 24 and 25 as a normally open circuit.

So far as described it will be seen that as indicated in Figure 1, the circuit closing device may be operated either by pressing downwardly with the thumb (see left hand portion of Figure 1) or the backs of the fingers may be employed (see right hand portion of Figure 1). In turning the steering wheel, with the thumb or fingers in engagement with the circuit closer's rim, as soon as the hand reaches the point 12 the thumb or fingers will leave the circuit closer rim and it will be restored to its normal position without danger of fingers bridging the gap between the two ends of the portion 11—11 and operating an erroneous signal.

From the drawings it will be seen that the rim sections 10 are secured to their respective spokes at such angles that the said sections normally lie inclined to the axis of the steering wheel instead of normal thereto so that when they are pressed down the said rim sections 10 will lie in a plane normal to the axis of the steering wheel and its post. While this is the preferable way to mount the rim sections, as it facilitates the introduction of the fingers between the steering wheel's rim 2, and the rim sections 10, nevertheless it is not a necessary or indispensable part of the invention and if desired the rim sections 10 may lie normally in the same plane.

Numerous modifications in the details of construction, form and general arrangement of parts can be made without departing from the spirit of our invention or the scope of the appended claims, for instance instead of providing the two contacts 24 and 25 to be closed by a bridging contact 26, one of the contacts 24 or 25 alone may be used and the circuit connection of the other wire made to the contact 26. As such minor changes are obvious and well within the scope of our invention further illustration is thought to be unnecessary.

What we claim is:

1. In direction signaling apparatus wherein is provided signals, a steering wheel having a rim, and a steering post; a circuit closing and opening switch comprising a support secured to the outside of the steering wheel post beneath the wheel, a two-part rim, L levers hinged to said support and carrying said two-part rim, means limiting the movement of said levers in one direction, springs between said support and said levers continuously acting to move said levers to their limits in one direction, and circuit terminals carried by said support and adapted to be closed upon moving said levers against the spring tension.

2. In direction signaling apparatus wherein is provided signals, a steering wheel having a rim, and a steering post; a circuit closing and opening switch comprising a support secured to the steering wheel post, a two-part rim, L levers hinged to said support and carrying said two-part rim, means limiting the movement of said levers in one direction, springs between said support and said levers continuously acting to move said levers to their limits in one direction, and circuit terminals carried by said support and adapted to be closed upon moving said levers against the spring tension, said levers including telescopic sections whereby the positions of said two-part rim with respect to the steering wheel's rim may be adjusted.

3. In current controlling mechanism, the combination with a steering wheel post and a steering wheel having a rim; a circuit making and breaking device comprising a box-like support fixed to the outside of said post and having radial projections, a two-part rim, each part of which has a spoke hinged between a pair of projections of said support whereby each rim part may have movement independently of the other, circuit terminal contacts within the space between said radial projections of said support and on said spokes whereby upon movement of said spokes in one direction the circuits may be closed, and upon movement thereof in the opposite direction the circuits will be opened, and means normally holding said rim parts in a given position and maintaining the circuits open.

4. In current controlling mechanism, the combination with a steering wheel post and a steering wheel having a rim; a circuit making and breaking device comprising a support fixed to said post, a two-part rim, each part of which has a spoke hinged to said support whereby each rim part may have movement independently of the other, circuit terminal contacts associated with said support and with said spokes whereby upon movement of said spokes in one direction the circuits may be closed, and upon movement thereof in the opposite direction the circuits will be opened, and means normally holding said rim parts in a given position and maintaining the circuits open, said rim parts each comprising an approximately semi-circular member, one end of which is extended inwardly from the remainder of the member to lie approximately parallel to said spokes, substantially as specified.

5. In circuit closers of a type applicable to motor vehicle direction signaling systems; a circuit switch comprising a support secured to the outside of a steering wheel's post beneath the wheel, a two-part ring-like rim, radial spokes hinged to said support, said spokes being of L form to provide a radial portion and a vertical portion, said support having sockets for said vertical portions, said spokes being hinged to said support, circuit terminal contacts mounted in said sockets, said vertical portions adapted to enter and constitute closures for said sockets and having provision for operating said contacts, and springs in said sockets engaging said vertical portions for the purposes specified.

6. In circuit closures for direction signals; a split clamp and supporting member adapted to fit a steering wheel post and be secured thereto, said member having at least one socket extension, circuit terminal contacts located in said socket extension, a lever hinged to said extension and having a short leg lying in said socket of said extension, and having a long leg extending radially of said member, means limiting movement of said lever in one direction, yieldable means tending to force said lever in one direction, and a rim segment secured to said long arm.

7. In circuit closures for direction signals; a split clamp and supporting member adapted to fit a steering wheel post and be secured thereto, said member having at least one socket extension, circuit terminal contacts located in said socket extension, a lever hinged to said extension and having a short leg lying in said socket of said extension, and having a long leg extending radially of said member, means limiting movement of said lever in one direction, yieldable means tending to force said lever in one direction, and a rim segment secured to said long arm, said long arm comprising telescopic sections whereby said rim segment may be located closer to or farther from the rim of a steering wheel.

8. In circuit closers for direction signals; a split clamp and supporting member adapted to fit a steering wheel post and be secured thereto, said member having at least one socket extension, circuit terminal contacts located in said socket extension, a lever hinged to said extension and having a short leg lying in said socket of said extension, and having a long leg extending radially of said member, means limiting movement of said lever in one direction, yieldable means tending to force said lever in one direction, and a rim segment secured to said long arm, said rim segment being flexible.

9. In circuit closers for direction signals; a split clamp and supporting member adapted to fit a steering wheel post and be secured thereto, said member having at least one socket extension, circuit terminal contacts located in said socket extension, a lever hinged to said extension and having a short leg lying in said socket of said extension, and having a long leg extending radially of said member, means limiting movement of said lever in one direction, yieldable means tending to force said lever in one direction, and a rim segment secured to said long arm, said rim segment being connected to said long arm between the segment's ends, one end of said segment being inwardly bent to lie parallel to said long arm for the purpose specified.

10. In circuit closers for direction signals; a split clamp and supporting member adapted to fit a steering post and be secured thereto, said member having a pair of vertically disposed parallel extension walls joined by a top wall to constitute a socket extension, said top wall having its outer edge slotted to provide one element of a hinge joint, an L-shaped lever slotted at the juncture of its two arms to constitute the other member of the hinge joint, a hinge pin connecting said elements of the hinge joint, said lever having a long arm and a short arm, the short arm lying between said plates as a front wall of the socket extension, circuit contacts mounted in spaced relation on said clamp within said socket extension, a contactor mounted on said short arm to cooperate with said circuit contacts, a spring continuously tending to move said lever in one direction, and means limiting the movement of said lever in said one direction.

11. In circuit closers for direction signals; a split clamp and supporting member adapted to fit a steering wheel post and be secured thereto, said member having a pair of vertically disposed parallel extension walls joined by a top wall to constitute a socket extension, said top wall having its outer edge slotted to provide one element of a hinge joint, an L-shaped lever slotted at the juncture of its two arms to constitute the other member of the hinge joint, a hinge pin connecting said elements of the hinge joint, said lever having a long arm and a short arm, the short arm lying between said plates as a front wall of the socket extension, circuit contacts mounted in spaced relation on said clamp within said socket extension, a contactor mounted on said short arm to cooperate with said circuit contacts, a spring continuously tending to move said lever in one direction, and means limiting the movement of said lever in said one direction, said last named means comprising cooperating stops on said lever and said top wall.

12. In circuit closers for direction signals; a split clamp and supporting member adapted to fit a steering post and be secured thereto, said member having a pair of vertically disposed parallel extension walls joined by a top wall to constitute a socket extension, said top wall having its outer edge slotted to provide one element of a hinge joint, an L-shaped lever slotted at the juncture of its two arms to constitute the other member of the hinge joint, a hinge pin connecting said elements of the hinge joint, said lever having a long arm and a short arm, the short arm lying between said plates as a front wall of the socket extension, circuit contacts mounted in spaced relation on said clamp within said socket extension, a contactor mounted on said short arm to cooperate with said circuit contacts, a spring continuously tending to move said lever in one direction, and means limiting the movement of said lever in said one direction, said lever having its long arm composed of telescopic parts adjustably secured together, the outer one of said parts carrying an operating rim sector.

ALEXANDER M. HUDSON.
CLARENCE H. TWETTEN.